(12) United States Patent
Wei et al.

(10) Patent No.: US 11,603,755 B2
(45) Date of Patent: Mar. 14, 2023

(54) DOWNHOLE ROCK DEBRIS EXTRACTION SYSTEM AND CONTROL METHOD FOR DOWNHOLE ROCK DEBRIS EXTRACTION SYSTEM

(71) Applicant: CNPS PETRO EQUIPMENT CO., LTD., Shandong (CN)

(72) Inventors: Bing Wei, Shandong (CN); Lili Sun, Zhejiang (CN)

(73) Assignee: CNPS PETRO EQUIPMENT CO., LTD., Shandong (CN)

( * ) Notice: Subject to any disclaimer, the term of this patent is extended or adjusted under 35 U.S.C. 154(b) by 0 days.

(21) Appl. No.: 16/973,440

(22) PCT Filed: Aug. 3, 2018

(86) PCT No.: PCT/CN2018/098529
§ 371 (c)(1),
(2) Date: Dec. 9, 2020

(87) PCT Pub. No.: WO2020/019367
PCT Pub. Date: Jan. 30, 2020

(65) Prior Publication Data
US 2021/0254449 A1 Aug. 19, 2021

(30) Foreign Application Priority Data

Jul. 27, 2018 (CN) .......................... 201810841754.8

(51) Int. Cl.
*E21B 47/04* (2012.01)
*E21B 47/002* (2012.01)
*E21B 49/02* (2006.01)

(52) U.S. Cl.
CPC ............ *E21B 47/04* (2013.01); *E21B 47/002* (2020.05); *E21B 49/02* (2013.01)

(58) Field of Classification Search
CPC ......... E21B 47/04; E21B 47/002; E21B 49/02
See application file for complete search history.

(56) References Cited

U.S. PATENT DOCUMENTS

| 5,358,057 | A | 10/1994 | Peters et al. |
| 2010/0193184 | A1* | 8/2010 | Dolman ................. E21B 47/11 175/42 |

(Continued)

FOREIGN PATENT DOCUMENTS

| CN | 1056553 | A | 11/1991 |
| CN | 1789656 | A | 6/2006 |

(Continued)

*Primary Examiner* — Taras P Bemko
(74) *Attorney, Agent, or Firm* — Yu Gang (57) ABSTRACT

A downhole rock debris extraction system is provided. The downhole rock debris extraction system includes a downhole marking component, a ground control component and a ground detection and extraction component. The downhole marking component is arranged at a drill bit for underground excavation or near the drill bit, and is configured to mark rock debris by spraying different types of markers in real time during the underground excavation performed by the drill bit; the ground detection and extraction component is configured to detect the types of the markers on the rock debris; and the ground control component is configured to manage and control the downhole marking component to mark the rock debris, and to manage and control the ground detection and extraction component to determine the types of the markers on the rock debris. Furthermore, a control method for the downhole rock debris extraction system is provided.

9 Claims, 3 Drawing Sheets

(56) References Cited

U.S. PATENT DOCUMENTS

2012/0325465 A1* 12/2012 Hammer ............... E21B 49/005
                                                                         166/64
2017/0074080 A1    3/2017  Peterson et al.
2020/0116019 A1*  4/2020  Ow .................... G01N 30/7206

FOREIGN PATENT DOCUMENTS

| CN | 201090210 Y | 7/2008 |
| CN | 103927547 A | 7/2014 |
| WO | 2012078204 A1 | 6/2012 |

* cited by examiner

DOWNHOLE ROCK DEBRIS EXTRACTION SYSTEM AND CONTROL METHOD FOR DOWNHOLE ROCK DEBRIS EXTRACTION SYSTEM

TECHNICAL FIELD

The present disclosure relates to the field of downhole rock sample sampling technologies, and in particular to a downhole rock debris extraction system and a control method for the downhole rock debris extraction system.

BACKGROUND

In various processes of drilling underground exploration, it is necessary to sample a downhole material for analysis and research. The downhole material extracted in real time is an intuitive material for timely understanding a formation lithology and an oil-gas layer A sample of the downhole material is obtained from mud returned upwards. Traditional methods for obtaining the downhole material corresponding to a depth usually calculate a time period for the material returned from the downhole to an uphole through a theoretical calculation method, a physical measurement method or a special lithology method. However, these methods have serious problems. That is, the material returned from the downhole to an uphole is greatly affected by a flow rate of fluid in a well, a size of a shaft and human factors. In addition, due to complexity of a drilling environment, the materials upwards returned from the different depths are easily mixed together. Therefore, in a current field, collected downhole rock debris is inaccurate, and may not truly reflect real information of the drilled formation, and a device that may extract the downhole material in real time is required in a drilling process.

Current modes of extracting downhole rock samples are as follows. For a first mode, after an underground rock is broken by a drill bit, rock fragments reaches the ground with drilling fluid, these rock fragments are called rock debris, and often called "sand samples". In the drilling process, a process that a geologist continuously collects and observes the rock debris and restores an underground geological section according to a certain sampling interval and a lay time period is called rock debris logging. This mode is high in ageing, simple and easy to implement, but extremely imprecise. For a second mode, sidewall coring is a mode which a logging cable is used for lowering a corer into a well, the corer is driven into a sidewall by an explosive, and a small piece of a rock is removed to understand the nature of the rock and its fluid. This mode is more accurate in sampling, but extremely high in cost, difficult to operate, and less in completed amount. For a third mode, a mode of drilling coring is used for obtaining a rock core through a coring bit. However, this mode brings a greater safety risk, a manufacturing process is more complicated, and a drilling speed is seriously affected, time and energy are wasted.

As to the problems in related art, none effective solution is provided yet at present.

SUMMARY

At least some embodiments of the present disclosure provide a downhole rock debris extraction system and a control method for the downhole rock debris extraction system, so as at least to partially solve problems in the related art.

In one embodiment of the present disclosure, a downhole rock debris extraction system is provided.

The downhole rock debris extraction system in accordance with the present disclosure includes:

a downhole marking component, a ground control component and a ground detection and extraction component; and the downhole marking component and the ground detection and extraction component are respectively electrically connected with the ground control component.

The downhole marking component is arranged at a drill bit for underground excavation or near the drill bit, and is configured to mark mined rock debris by spraying different types of markers in real time during the underground excavation performed by the drill bit.

The ground detection and extraction component is configured to detect the types of the markers on the rock debris.

The ground control component is configured to manage and control the downhole marking component to mark the rock debris, and to manage and control the ground detection and extraction component to determine the types of the markers on the rock debris.

In an optional embodiment, in the downhole rock debris extraction system as mentioned above, the downhole marking component includes markers, a marker sprayer, a storage element and a control connection element; the markers are stored in the storage element; the marker sprayer is connected with the storage element, and is configured to enable the markers stored in the storage element to be sprayed from the marker sprayer, so that the markers are adhered to the rock debris; and the control connection element is respectively connected with the marker sprayer and the ground control component, and is configured to enable the marker sprayer to spray according to manage and control of the ground control component.

In an optional embodiment, in the downhole rock debris extraction system as mentioned above, the ground detection and extraction component includes a detector, a sampler and a sample storage; the detector is configured to detect the markers on the excavated rock debris; the sampler is electrically connected with the ground control component, and is configured to capture the rock debris; and the sample storage is configured to store the rock debris according to a depth.

In another embodiment of the present disclosure, a control method for the downhole rock debris extraction system is further provided.

The control method for the downhole rock debris extraction system in accordance with the present disclosure includes the following operations.

A ground control component determines a first correspondence relation between well depth information and time information in real time.

The ground control component sends marker spraying information to a downhole marking component, so that the downhole marking component sprays different types of markers according to different marker spraying information.

The downhole marking component sprays a type corresponding to the marker spraying information of each marker onto rock debris excavated by a drill bit.

The ground control component determines a second correspondence relation between a time point for spraying each marker and a type of each marker in real time.

The ground control component manages and controls the ground detection and extraction component to perform marker detection on the mined rock debris, to obtain a detection result, and determines the types of the markers.

The ground control component determines original depth information corresponding to the rock debris according to the detection result, the first correspondence relation and the second correspondence relation, herein the original depth information is information for representing a vertical distance between a position before mining the rock debris and a mining uphole, and the well depth information of the rock debris is consistent with the original depth information of the rock debris.

In an optional embodiment, in the control method for the downhole rock debris extraction system as mentioned above, an operation that the ground control component determines a first correspondence relation between well depth information and time in real time includes the following steps.

The ground control component determines the time in real time through a time sub-component.

The ground control component acquires current well depth information of the drill bit and a current time point through a well depth distance measurement sub-component.

The ground control component determines the first correspondence relation between the well depth information and the time information.

In an optional embodiment, in the control method for the downhole rock debris extraction system as mentioned above, an operation that the ground control component sends the marker spraying information to the downhole marking component includes the following steps.

The ground control component pre-generates the marker spraying information that the different types of multiple markers are circularly sprayed in a fixed spraying frequency and a cycle period.

The ground control component sends the marker spraying information to the downhole marking component.

In an optional embodiment, in the control method for the downhole rock debris extraction system as mentioned above, an operation that the ground control component determines the second correspondence relation between the time point for spraying each marker and the type of each marker in real time further includes the following steps.

The ground control component determines the time point in real time through the time sub-component.

The ground control component determines the type of each marker sprayed by the downhole marking component every time and the time point for spraying each marker.

The ground control component determines the second correspondence relation between the type of each marker and the time point for spraying each marker.

The ground control component stores the time point for spraying each marker and the type of each marker in a database according to the second correspondence relation.

In an optional embodiment, in the control method for the downhole rock debris extraction system as mentioned above, an operation that the ground control component determines the original depth information corresponding to the rock debris according to the detection result, the first correspondence relation and the second correspondence relation includes the following operations.

The ground control component determines the types of the markers on the rock debris according to the detection result.

According to the second correspondence relation, matching is performed in the database to obtain the types of the markers on the rock debris.

According to the first correspondence relation, the original depth information corresponding to the rock debris is determined.

In an optional embodiment, in the control method for the downhole rock debris extraction system as mentioned above, an operation that the ground control component manages and controls the ground detection and extraction component to perform marker detection on the mined rock debris to obtain the detection result, and determines the types of the markers includes the following steps.

The ground control component manages and controls a detector to obtain image information of the rock debris.

The ground control component determines colors of the markers on the rock debris through image identification after acquiring the image information.

The ground control component determines the types of the markers through the colors of the markers.

In an optional embodiment, in the control method for the downhole rock debris extraction system as mentioned above, the control method further includes the following steps.

The ground control component sorts all of the rock debris in an original depth sequence according to the original depth information of each of the rock debris to obtain sequence information.

The ground control component manages and controls a sampler to successively capture the rock debris according to the sequence information, and stores the rock debris in a sample storage, and the sampler is a device arranged in the ground detection and extraction component and is configured to capture the rock debris; and the sample storage is a device arranged in the ground detection and extraction component and is configured to store the rock debris according to the depth.

In at least some embodiments of the present disclosure, a mode that downhole rock debris marking is performed to improve sampling precision through the markers is adopted, and the first correspondence relation between the well depth information and the time information is determined in real time by the ground control component; the ground control component sends the marker spraying information to the downhole marking component; the downhole marking component sprays the markers onto rock debris excavated by the drill bit according to the marker spraying information; the ground control component determines the second correspondence relation between the time point for spraying each marker and the type of each marker in real time; the ground control component manages and controls the ground detection and extraction component to perform marker detection on the rock debris to obtain a detection result, and determines the types of the markers; the ground control component determines original depth information corresponding to the rock debris according to the detection result, the first correspondence relation and the second correspondence relation; and it may effectively meet the requirements of high detection ageing and simple and easy operation for downhole rock debris extraction, and the method may implement the purpose of accurate sampling, low sampling cost and high completed amount, thereby technical problems in the related art that the sampling is imprecise or the cost is high and the completed amount is lower are solved.

BRIEF DESCRIPTION OF THE DRAWINGS

Drawings for constituting a part of the present disclosure are used for providing further understanding of the present disclosure, so that other features, purposes and advantages of the present disclosure become clearer. The schematic embodiment drawings of the present disclosure and descriptions thereof area used for explaining the present disclosure, and do not constitute improper limitation to the present disclosure. In the drawings.

DETAILED DESCRIPTION

In order to make those skilled in the art understand schemes of the present disclosure better, the technical schemes in embodiments of the present disclosure are clearly and completely described below in combination with drawings in the embodiments of the present disclosure. Apparently, the embodiments described are a part of the embodiments of the present disclosure, and not all of the embodiments. Based on the embodiments in the present disclosure, all other embodiments obtained by those of ordinary skill in the art without creative work shall fall within a scope of protection of the present disclosure.

It is to be noted that terms "first", "second" and the like in the description and claims and the above drawings of the present disclosure are used for distinguishing similar objects, and are not necessarily used to describe a specific sequence or a precedence order. It should be understood that data used in this way may be interchanged in appropriate cases for the embodiments of the present disclosure described here. In addition, terms "including" and "having" and any variations of them are intended to cover non-exclusive inclusions, for example, a process, a method, a system, a product or a device that includes a series of operations or elements is not necessarily limited to those operations or elements listed clearly, but may include other operations or elements that are not clearly listed or are inherent to these process, method, product or device.

In the present disclosure, orientation or position relations indicated by terms "up", "down", "left", "right", "front", "after", "top", "bottom", "inside", "outside", "middle", "vertical", "horizontal", "transverse", "longitudinal" and the like are based on the orientation or position relations shown in the drawings. These terms are mainly used for describing the present disclosure and the embodiments thereof better, and are not used for limiting that an indicated device, element or component should have a specific orientation, or be constructed and operated in the specific orientation.

In addition, a part of the above terms may be used for representing other meanings in addition to the orientation or position relations, for example, the term "up" may also be used for representing a certain attachment relation or connection relation in some cases. For those of ordinary skill in the art, the specific meanings of these terms in the present disclosure may be understood according to a specific case.

In addition, terms "installed", "set", "provided", "connected", "linked" and "sheathed" should be understood broadly. For example, it may be fixed connection, detachable connection, or integrated construction; it may be mechanical connection, or electrical connection; it may be directly connected, or indirectly connected through an intermediate medium, or internally communicated between two devices, elements or components. For those of ordinary skill in the art, the specific meanings of the above terms in the present disclosure may be understood according to the specific case.

It is to be noted that the embodiments in the present disclosure and the features in the embodiments may be combined with each other in the case without conflicting. The present disclosure is described in detail below with reference to the drawings and in combination with the embodiments.

Figure 1:
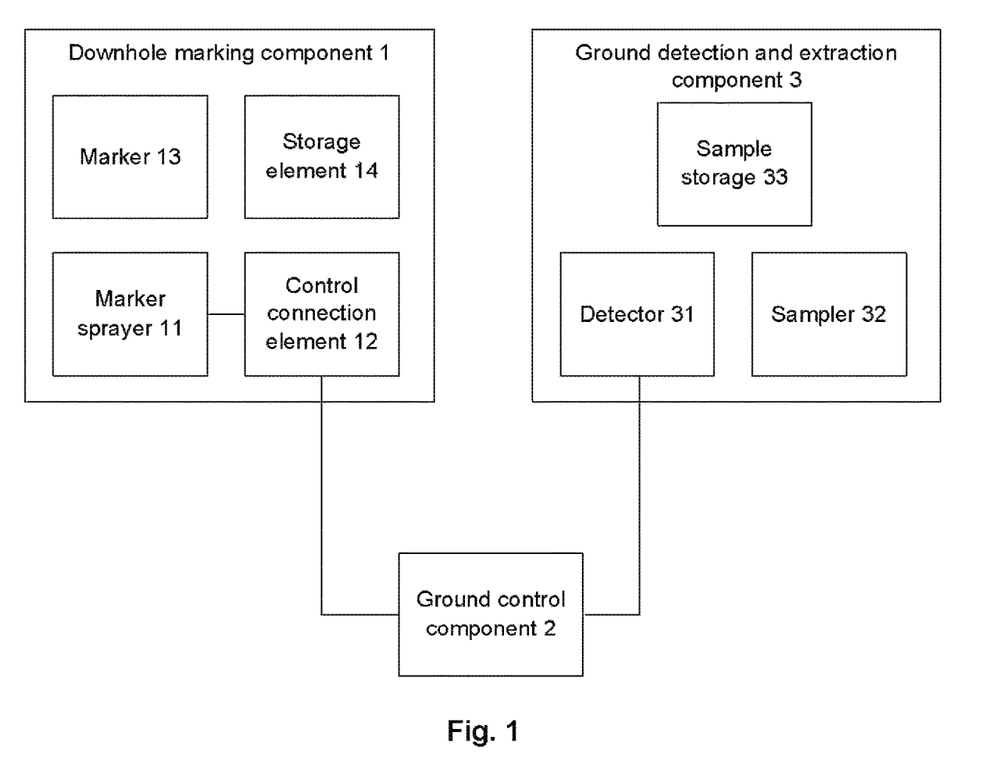
FIG. 1 is a schematic diagram of device and component connection of a system according to an embodiment of the present disclosure.

In an embodiment of the present disclosure, as shown in FIG. 1, a downhole rock debris extraction system is provided.

The downhole rock debris extraction system according to the embodiment of the present disclosure includes:

a downhole marking component 1, a ground control component 2 and a ground detection and extraction component 3; and the downhole marking component 1 and the ground detection and extraction component 3 are respectively electrically connected with the ground control component 2.

The downhole marking component 1 is arranged at a drill bit for underground excavation or near the drill bit, and is configured to mark mined rock debris by spraying different types of markers 13 in real time during the underground excavation performed by the drill bit.

The ground detection and extraction component 3 is configured to detect the types of the markers on the rock debris.

The ground control component 2 is configured to manage and control the downhole marking component 1 to mark the rock debris, and to manage and control the ground detection and extraction component 3 to determine the types of the markers on the rock debris.

In some embodiments, in the downhole rock debris extraction system as mentioned above, the downhole marking component 1 includes markers 13, a marker sprayer 11, a storage element 14 and a control connection element; the markers 13 are stored in the storage element 14; the marker sprayer 11 is connected with the storage element 14, and configured to enable the markers 13 stored in the storage element 14 to be sprayed from the marker sprayer 11, so that the markers 13 are adhered to the rock debris; and the control connection element is respectively connected with the marker sprayer 11 and the ground control component 2, and is configured to enable the marker sprayer 11 to spray according to managing and controlling of the ground control component 2. Generally, the markers 13 have the features of being insoluble in drilling fluid, being easily adhered to solid substances and being easy to detect. In an optional embodiment, a colored colloid or chemical adsorbent which is insoluble in the drilling fluid may be adopted. The marker sprayer 11 is a liquid spraying device which is configured to spray the markers 13 in the storage element, and the sprayer may adopt a fluid sprayer or a steam sprayer according to the types of the markers 13. The storage element is configured to store the markers 13, the storage element 14 is generally a well-sealed storage cavity made of a solid material, and the material used for the storage element 14 has corrosion resistance, does not react with the markers 13, and is connected with the sprayer. The control connection element is an information transmission device which is used for wire or wireless communication of the ground control component 2, so that the marker sprayer 11 may spray according to the requirements under the managing and controlling of the ground control component 2.

In some embodiments, in the downhole rock debris extraction system as mentioned above, the ground detection and extraction component 3 includes a detector 31, a sampler 32 and a sample storage 33; the detector 31 is configured to detect the markers 13 on the excavated rock debris; the sampler 32 is electrically connected with the ground control component 2, and is configured to capture the rock debris; and the sample storage 33 is configured to store the rock debris according to a depth.

Figure 2:
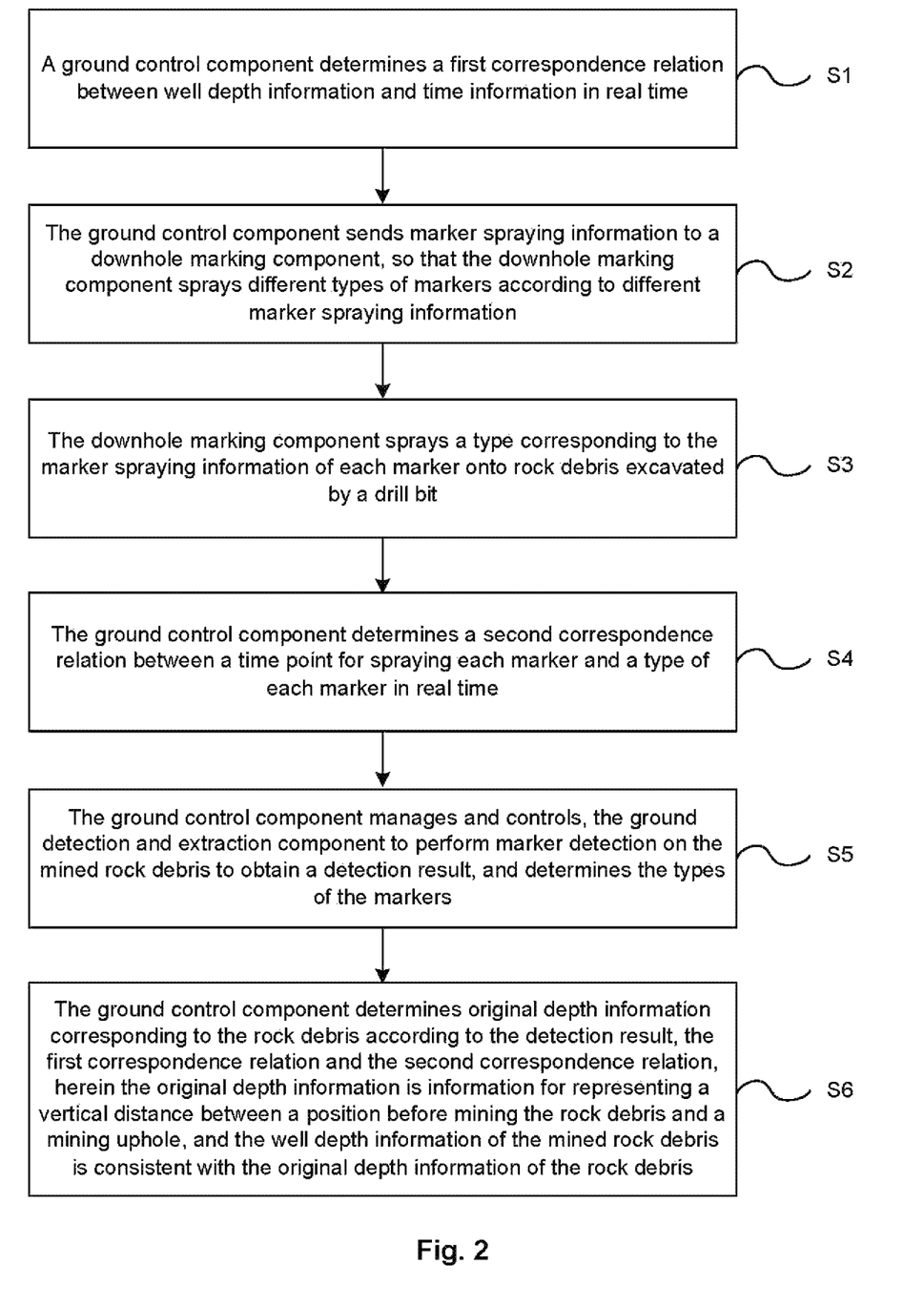
FIG. 2 is a flow schematic diagram of a method for controlling the system as shown in FIG. 1 according to an embodiment of the present disclosure.

In another embodiment of the present disclosure, a control method for implementing the above downhole rock debris extraction system is further provided, and is configured to acquire original depth information of rock debris; as shown in FIG. 2, the method includes steps S1 to S6 shown as follows.

At step S1, a ground control component determines a first correspondence relation between well depth information and time information in real time.

At step S2, the ground control component sends marker spraying information to a downhole marking component, so that the downhole marking component sprays different types of markers according to different marker spraying information.

At step S3, the downhole marking component sprays a type corresponding to the marker spraying information of each marker onto rock debris excavated by a drill bit.

At step S4, the ground control component determines a second correspondence relation between a time point for spraying each marker and a type of each marker in real time.

At step S5, the ground control component manages and controls, the ground detection and extraction component to perform marker detection on the mined rock debris to obtain a detection result, and determines the types of the markers.

At step S6, the ground control component determines original depth information corresponding to the rock debris according to the detection result, the first correspondence relation and the second correspondence relation, herein the original depth information is information for representing a vertical distance between a position before mining the rock debris and a mining uphole, and the well depth information of the mined rock debris is consistent with the original depth information of the rock debris.

In a specific application, the ground control component may be hardware, software, an embedded logic component or an electronic device combined by two or more such components, and may perform an appropriate function implemented or supported by a user terminal. Thus, it has both strong data processing capability and corresponding function software that may achieve the control method of the present disclosure. In an optional embodiment, the ground control component may also send or receive a signal through modes including wire and wireless networks and the like. In addition, the ground control component may include a display screen which may include physical keys, touch keys covering the display screen or a pocket keyboard combined by them; a user identification component card which may include a Read Only Memory (ROM), a Random Access Memory (RAM), a flash memory or a storage device arbitrarily combined by them; a Wi-Fi and/or a Bluetooth interface; a wireless phone interface; a power management circuit with an associated battery; a Universal Serial Bus (USB) interface and a connector; an audio management system with an associated microphone, a loudspeaker and a headphone jack; and various optional accessories such as a digital camera, a global positioning system, and an accelerator. Finally, at least one operating system may also be installed or run, such as Windows Server, Mac OS X, Unix, Linux, FreeBSD etc.

A user may input the corresponding marker spraying information in real time through an input device connected with the ground control component or automatically configure the generated marker spraying information according to a software system, and send the marker spraying information to the downhole marking component through the ground control component, and a corresponding instruction is generated after the marker spraying information is interpreted by the downhole marking component so that the markers are sprayed by the marker sprayer. In an optional embodiment, when it is a large piece of the rock debris, the marking may also be performed in modes of spraying different numbers, as to distinguish a sequential order of the marking or the well depth information generated by the rock debris; and the spraying of the markers is performed along with an excavation process of the excavation drill bit, and the rock debris generated by the excavation may be transmitted to the ground in real time during the excavation process, and it is more beneficial to the orderliness of later detection. After the rock debris is transmitted to the ground, the ground control component manages and controls the ground detection and extraction component to detect the rock debris. Generally, the ground detection and extraction component has an image identification function, and may be provided with a corresponding image collection device, image information collection may be firstly performed on the markers on the different rock debris surfaces, and then the image information is identified through a processing element. As to obtain a final detection result, and the detection result may be automatically imported into a storage device for storage. In an optional embodiment, the well depth information may be collected at the same time while the markers are sprayed; and the original depth information of the rock debris is determined according to the detection result and the well depth information.

In some embodiments, in the control method for the downhole rock debris extraction system as mentioned above, an operation that the ground control component determines a first correspondence relation between well depth information and time in real time includes the following steps.

The ground control component determines the time in real time through a time sub-component.

The ground control component acquires current well depth information of the drill bit and a current time point through a well depth distance measurement sub-component.

The ground control component determines the first correspondence relation between the well depth information and the time information.

In, an optional embodiment, the excavation drill bit may measure the current well depth and the current time point in real time generally, thus the first correspondence relation between an accurate time point and the well depth information may be obtained. In this case, the time sub-component is a timing component on the drill bit, and the well depth distance measurement sub-component is a component on the drill bit which performs distance measurement. In addition, the downhole marking component may determine the current well depth information in modes of acquiring a depth excavated by the drill bit or detecting a distance from the uphole to the depth excavated by the drill bit by means of an infrared laser and the like.

In some embodiments, in the control method for the downhole rock debris extraction system as mentioned above, an operation that the ground control component sends the marker spraying information to the downhole marking component, including the following steps.

The ground control component pre-generates the marker spraying information that the different types of multiple markers are circularly sprayed in a fixed spraying frequency according to a sequence. Specifically, in order to achieve the spraying of the different types of the markers, multiple storage elements are provided, or multiple mutually independent marker storage spaces are provided in the same storage element. And the marker sprayer is respectively communicated with each of the storage elements or the marker storage spaces, and there is a corresponding selection managing and controlling element which is configured to enable the marker sprayer to absorb the different markers according to the different marker spraying, information and spray. In an optional embodiment, at least ten types of the markers may be provided, and the spraying frequency is a time interval between two times of the adjacent spraying. In an optional embodiment, the time interval is 3 s. And generally, the spraying frequency is set fixedly. For the marker spraying information that the different types of the multiple markers are circularly sprayed according to the sequence, specifically, each of the different types of the markers is sprayed according to a fixed sequence, and after one cycle of the spraying, the spraying is preformed again according to the fixed sequence, until all sampling is completed. Since the rock debris excavated by the general drill bit are returned to the ground in real time and detected, a case that the same type of the markers in the different cycles are returned to the ground at the same time may not be caused. In an optional embodiment, there may be other options for the types of the markers, such as modes of mechanical adsorbing and wrapping are adopted.

The ground control component sends the marker spraying information to the downhole marking component.

In some embodiments, in the control method for the downhole rock debris extraction system as mentioned above, an operation that the ground control component determines the second correspondence relation between the time point for spraying each marker and the type of each marker in real time further includes the following steps.

The ground control component determines the time point in real time through the time sub-component.

The ground control component determines the type of each marker sprayed by the downhole marking component every time and the time point for spraying each marker.

The ground control component determines the second correspondence relation between the type of each marker and the time point for spraying each marker.

The ground control component stores the time point for spraying each marker and the type of each marker in a database according to the second correspondence relation.

Specifically, a complete execution process is taken as an example. After the marker sprayer of the downhole marking component marks the rock debris, the ground control component confirms the types of the current sprayed markers and time points in real time. And the first correspondence relation obtained by establishing the well depth information and the types of the sprayed markers is stored in the database. In an optional embodiment, the well depth information and the types of the sprayed markers are stored in a time sequence. Since the types of the markers are limited, the types of the markers may be periodically circularly sprayed, in different cycles, the different cycles may be distinguished in the database. And after comparison is completed by the detector, data which is already compared is distinguished by modes of marking or deleting and the like, so as to avoid cases such as comparison confusion. In an optional embodiment, the second correspondence relation may be written and stored in a form of a data table.

In some embodiments, in the control method for the downhole rock debris extraction system as mentioned above, an operation that the ground control component determines the original depth information corresponding to the rock debris according to the detection result, the first correspondence relation and the second correspondence relation includes the following steps.

The ground control component determines the types of the markers on the rock debris according to the detection result.

According to the second correspondence relation, matching is performed in the database to obtain the types of the markers on the rock debris.

According to the first correspondence relation, the original depth information corresponding to the rock debris is determined.

Specifically, while a detection result shows that type information of a marker corresponding to rock debris A is a yellow marker, the ground control component needs to match in all of the second correspondence relations to obtain the specific second correspondence relation that the type of the marker is the yellow marker. And after the specific second correspondence relation is obtained by matching, time information displayed in the second correspondence relation is acquired, for example, 13:30:30, and then the well depth information corresponding to 13:30:30 is determined according to the first correspondence relation, so that a complete matching corresponding process of the rock debris A may be achieved.

Manual repeated comparison and identification may be eliminated by using this method, and working efficiency is improved; and the difficulty of manual operations and the probability of caused errors are effectively reduced.

In some embodiments, in the control method for the downhole rock debris extraction system as mentioned above, an operation that the ground control component manages and controls the ground detection and extraction component to perform marker detection on the mined rock debris to obtain the detection result, and determines the types of the markers includes the following steps.

The ground control component manages and controls a detector to obtain image information of the rock debris.

The ground control component determines colors of the markers on the rock debris through image identification after acquiring the image information.

The ground control component determines the types of the markers through the colors of the markers.

Specifically, in this embodiment, a method of the image identification is used for identifying the types of the markers, since the image identification, especially color identification, is a relatively mature technology at present, the extremely high accuracy may be obtained, and processing is rapid, it is more suitable for a large number of identification processing tasks.

In some embodiments, in the control method for the downhole rock debris extraction system as mentioned above, the control method further includes the following steps.

The ground control component sorts all of the rock debris in an original depth sequence according to the original depth information of each of the rock debris to obtain sequence information.

The ground control component manages and controls a sampler to successively capture the rock debris according to the sequence information, and stores the rock debris in a sample storage, herein the sampler is a device arranged in the ground detection and extraction component and is configured to capture the rock debris; and the sample storage is a device arranged in the ground detection and extraction component and is configured to store the rock debris according to the depth.

This process may re-establish depth relation information between the rock debris at the original depth before underground mining. The deepest rock debris may be placed at the lowest end of the sample storage generally, and then the rock, debris is successively placed in a descending order according to the original depth information of each rock debris, thus an original underground geological structure may be completely restored. The manual identification may be eliminated by using this method, and the working efficiency is improved; at the same time, it allows that the rock debris does not need to be uploaded in real time, the investment of a device for underground operations and the difficulty of construction and excavation are effectively reduced.

It is to be noted that the operations shown in the flow diagram of the drawings may be executed in a computer system such as a set of computer-executable instructions, in addition, although a logical sequence is shown in the flow diagram, in some cases, the operations shown or described may be executed in a different sequence than here.

Figure 3:
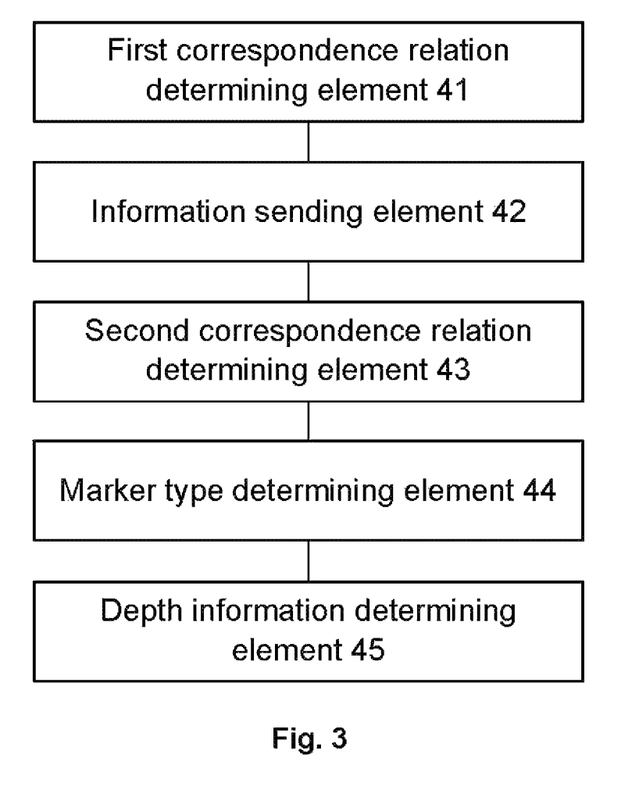
FIG. 3 is a component connection schematic diagram of a function component of a ground control component according to an embodiment of the present disclosure.

In another embodiment of the present disclosure, an apparatus for achieving the above control method for the downhole rock debris extraction system is further provided. And as shown in FIG. 3, the apparatus is applied to the ground control component, including: a first correspondence relation determining element 41, an information sending element 42, a second correspondence relation determining element 43, a marker type determining element 44, and a depth information determining element 45.

The first correspondence relation determining element 41 is configured to determine a first correspondence relation between well depth information and time information in real time through the ground control component.

The information sending element 42 is configured to enable the ground control component to send marker spraying information to a downhole marking component, so that the downhole marking component sprays different types of markers according to different marker spraying information; and the downhole marking component sprays a type corresponding to the marker spraying information of each marker onto rock debris excavated by an drill bit.

The second correspondence relation determining element 43 is configured to determine a second correspondence relation between a time point for spraying each marker and a type of each marker in real time through the ground control component.

The marker type determining element 44 is configured to manage and control the ground detection and extraction component to perform marker detection on the mined rock debris to obtain a detection result, and to determine the types of the markers through the ground control component.

The depth information determining element 45 is configured to determine original depth information corresponding to the rock debris according to the detection result, the first correspondence relation and the second correspondence relation through the ground control component, herein the original depth information is information for representing a vertical distance between a position before mining the rock debris and a mining uphole, and the well depth information of the mined rock debris is consistent with the original depth information of the rock debris.

Specifically, a specific process that each component in the apparatus of the embodiment of the present disclosure achieves functions thereof may refer to the related description in the embodiments of the method, and it is not repeatedly described here.

Apparently, it should be understood by those skilled in the art that each component or each operation of the disclosure as mentioned above may be achieved by a general computing device, they may be integrated in a single computing device, or distributed in a network formed by multiple computing devices, optionally, they may be achieved by program codes which may be executed by the computing device, so they may be stored in a storage device and executed by the computing device, or they may be respectively made into individual integrated circuit components, or multiple components or operations in them are made into a single integrated circuit component to achieve. In this way, the disclosure is not limited to any specific hardware and software combinations.

The above are exemplary embodiments of the present disclosure, and are not used for limiting the present disclosure, various modifications and changes may be made to the present disclosure by those skilled in the art. Any modifications, equivalent replacements, improvements and the like made within spirit and principle of the present disclosure shall be included in the scope of protection of the present disclosure.

What is claimed is:

1. A downhole rock debris extraction system, comprising: a downhole marking component, a ground control component and a ground detection and extraction component; wherein the downhole marking component and the ground detection and extraction component are respectively electrically connected with the ground control component;
the downhole marking component is arranged at a drill bit for underground excavation or near the drill bit, and is configured to mark rock debris by spraying different types of markers in real time during the underground excavation performed by the drill bit;
the ground detection and extraction component is configured to detect the types of the markers on the rock debris; and
the ground control component is configured to manage and control the downhole marking component to mark the rock debris, and to manage and control the ground detection and extraction component to determine the types of the markers on the rock debris;
wherein the ground control component is configured to pre-generate the marker spraying information that the different types of a plurality of markers are circularly sprayed in a fixed spraying frequency according to a sequence, and send the marker spraying information to the downhole marking component, wherein the marker spraying information that the different types of the plurality of markers are circularly sprayed according to the sequence comprises each of the different types of the markers is sprayed according to the sequence, and after one cycle of the spraying, the spraying is preformed again according to the sequence, until all sampling is completed, spraying different types of markers is spraying different numbers.

2. The downhole rock debris extraction system as claimed in claim 1, wherein the downhole marking component comprises markers, a marker sprayer, a storage element and a control connection element; the markers are stored in the storage element; the marker sprayer is connected with the storage element, and is configured to enable the markers stored in the storage element to be sprayed from the marker sprayer, so that the markers are adhered to the rock debris;

and the control connection element is respectively connected with the marker sprayer and the ground control component, and is configured to enable the marker sprayer to spray according to managing and controlling of the ground control component.

3. The downhole rock debris extraction system as claimed in claim 2, wherein the ground detection and extraction component comprises a detector, a sampler and a sample storage; the detector is configured to detect the markers on the rock debris; the sampler is electrically connected with the ground control component, and is configured to capture the rock debris; and the sample storage is configured to store the rock debris according to a depth.

4. A control method for a downhole rock debris extraction system, comprising:
 determining, by a ground control component, a first correspondence relation between well depth information and time information in real time;
 sending, by the ground control component, marker spraying information to a downhole marking component, so that the downhole marking component sprays different types of markers according to different marker spraying information;
 spraying, by the downhole marking component, a type corresponding to the marker spraying information of each marker onto rock debris excavated by an drill bit;
 determining, by the ground control component, a second correspondence relation between a time point for spraying each marker and a type of each marker in real time;
 managing and controlling, by the ground control component, the ground detection and extraction component to perform marker detection on the rock debris, to obtain a detection result, and determining, by the ground control component, the types of the markers; and
 determining, by the ground control component, original depth information corresponding to the rock debris according to the detection result, the first correspondence relation and the second correspondence relation, wherein the original depth information is information for representing a vertical distance between a position before mining the rock debris and a mining uphole, and the well depth information of the rock debris is consistent with the original depth information of the rock debris;
 wherein sending, by the ground control component, the marker spraying information to the downhole marking component comprises: pre-generating, by the ground control component, the marker spraying information that the different types of a plurality of markers are circularly sprayed in a fixed spraying frequency according to a sequence, wherein the marker spraying information that the different types of the plurality of markers are circularly sprayed according to the sequence comprises each of the different types of the markers is sprayed according to the sequence, and after one cycle of the spraying, the spraying is preformed again according to the sequence, until all sampling is completed, spraying different types of markers is spraying different numbers; and sending, by the ground control component, the marker spraying information to the downhole marking component.

5. The control method for the downhole rock debris extraction system as claimed in claim 4, wherein determining, by the ground control component, the first correspondence relation between the well depth information and the time information in real time comprises:
 determining, by the ground control component, the time information in real time through a time sub-component;
 acquiring, by the ground control component, current well depth information of the drill bit and a current time point through a well depth distance measurement sub-component; and
 determining, by the ground control component, the first correspondence relation between the well depth information and the time information.

6. The control method for the downhole rock debris extraction system as claimed in claim 4, wherein determining, by the ground control component, the second correspondence relation between the time point for spraying each marker and the type of each marker in real time further comprises:
 determining, by the ground control component, the time point in real time through the time sub-component;
 determining, by the ground control component, the type of each marker sprayed by the downhole marking component every time and the time point for spraying each marker;
 determining, by the ground control component, the second correspondence relation between the type of each marker and the time point for spraying each marker; and
 storing, by the ground control component, the time point for spraying each marker and the type of each marker in a database according to the second correspondence relation.

7. The control method for the downhole rock debris extraction system as claimed in claim 6, wherein determining, by the ground control component, the original depth information corresponding to the rock debris according to the detection result, the first correspondence relation and the second correspondence relation comprises:
 determining, by the ground control component, the types of the markers on the rock debris according to the detection result;
 according to the second correspondence relation, matching in the database to obtain the types of the markers on the rock debris; and
 according to the first correspondence relation, determining, the original depth information corresponding to the rock debris.

8. The control method for the downhole rock debris extraction system as claimed in claim 4, wherein managing and controlling, by the ground control component, the ground detection and extraction component to perform marker detection on the rock debris to obtain the detection result, and determining, by the ground control component, the types of the markers, comprising:
 managing and controlling, by the ground control component, a detector to obtain image information of the rock debris;
 determining, by the ground control component, colors of the markers on the rock debris through image identification after acquiring the image information; and
 determining, by the ground control component, the types of the markers through the colors of the markers.

9. The control method for the downhole rock debris extraction system as claimed in claim 4, further comprising:
 sorting, by the ground control component, all of the rock debris in an original depth sequence according to the original depth information of each of the rock debris, to obtain sequence information; and
 managing and controlling, by the ground control component, a sampler to successively capture the rock, debris according to the sequence information, and storing, by the ground control component, the rock debris in a sample storage, wherein the sampler is a device arranged in the ground detection and extraction component and is configured to capture the rock debris; and the sample storage is a device arranged in the ground detection and extraction component and is configured to store the rock debris according to the depth.

* * * * *